(12) United States Patent
Roerig et al.

(10) Patent No.: US 10,695,866 B2
(45) Date of Patent: Jun. 30, 2020

(54) MELTING BEAM SURFACE PROCESSING IN ADDITIVE MANUFACTURING

(71) Applicant: General Electric Company, Schenectady, NY (US)

(72) Inventors: Felix Martin Gerhard Roerig, Baden (CH); Thomas Etter, Muhen (CH); Matthias Hoebel, Windisch (CH); Julius Andreas Schurb, Zurich (CH)

(73) Assignee: General Electric Company, Schenectady, NY (US)

( * ) Notice: Subject to any disclaimer, the term of this patent is extended or adjusted under 35 U.S.C. 154(b) by 536 days.

(21) Appl. No.: 15/493,313

(22) Filed: Apr. 21, 2017

(65) Prior Publication Data
US 2018/0304406 A1    Oct. 25, 2018

(51) Int. Cl.
*B23K 26/342* (2014.01)
*B33Y 10/00* (2015.01)
(Continued)

(52) U.S. Cl.
CPC .......... *B23K 26/342* (2015.10); *B22F 3/1055* (2013.01); *B33Y 10/00* (2014.12);
(Continued)

(58) Field of Classification Search
CPC .............................. B33Y 30/00; B23K 26/342
See application file for complete search history.

(56) References Cited

U.S. PATENT DOCUMENTS

| | | | |
|---|---|---|---|
| 2008/0241392 A1* | 10/2008 | Dimter | B22F 3/1055 427/256 |
| 2014/0348692 A1* | 11/2014 | Bessac | B22F 3/1055 419/53 |

(Continued)

FOREIGN PATENT DOCUMENTS

| | | |
|---|---|---|
| DE | 19818469 A1 | 10/1998 |
| DE | 102011105045 B3 | 6/2012 |

(Continued)

OTHER PUBLICATIONS

Raya et al., Effect of Hot Isostatic Pressing on Mechanical Properties and Dimensional Accuracy of Intentionally Porous Ti6Al4V Parts made by Selective Laser Melting, Contributed Papers from Materials Science and Technology, 2016, pp. 35-42.

*Primary Examiner* — Geoffrey S Evans
(74) *Attorney, Agent, or Firm* — James Pemrick; Hoffman Warnick LLC

(57) ABSTRACT

In some cases, an additive manufacturing (AM) system includes: a process chamber for additively manufacturing a component, the process chamber having: a build platform; at least one melting beam scanner configured to emit a melting beam for melting powder on the build platform; an applicator for applying layers of powder to the build platform; and a reservoir for storing powder; and a control system coupled with the set of melting beam scanners, the control system configured to: apply the melting beam to a layer of powder on the build platform along a primary melting path; and apply the melting beam to the layer of powder on the
(Continued)

build platform along a re-melting path after applying the melting beam along the primary melting path, the re-melting path overlapping a portion of the primary melting path and applied only in an area proximate a perimeter of the component.

20 Claims, 9 Drawing Sheets

(51) Int. Cl.
  *B33Y 30/00*   (2015.01)
  *B33Y 50/02*   (2015.01)
  *B22F 3/105*   (2006.01)
(52) U.S. Cl.
  CPC ............... *B22F 2003/1056* (2013.01); *B22F 2003/1057* (2013.01); *B22F 2203/03* (2013.01); *B22F 2998/00* (2013.01); *B33Y 30/00* (2014.12); *B33Y 50/02* (2014.12)

(56) References Cited

U.S. PATENT DOCUMENTS

| | | | |
|---|---|---|---|
| 2015/0198052 A1 | 7/2015 | Pavlov et al. | |
| 2015/0202716 A1* | 7/2015 | Bruck | B23K 26/0661 419/9 |
| 2015/0202717 A1* | 7/2015 | Bruck | B23K 25/005 219/73.21 |
| 2016/0052087 A1 | 2/2016 | O'Neill | |
| 2018/0050423 A1* | 2/2018 | Hoferer | B22F 3/1055 |
| 2018/0250743 A1* | 9/2018 | Mamrak | B22F 3/1055 |

FOREIGN PATENT DOCUMENTS

| | | |
|---|---|---|
| EP | 0863806 B1 | 7/2002 |
| WO | 2016079495 A1 | 5/2016 |
| WO | 2016201326 A1 | 12/2016 |

* cited by examiner

MELTING BEAM SURFACE PROCESSING IN ADDITIVE MANUFACTURING

FIELD OF THE INVENTION

The subject matter disclosed herein relates to manufacturing. More particularly, the subject matter disclosed herein relates to controlling additive manufacturing in melting beam-based systems.

BACKGROUND OF THE INVENTION

Traditional manufacturing has relied upon subtractive approaches for forming components in desired shapes. These subtractive approaches involve removing a portion of an initial, raw material, and can utilize cutting and/or machining tools to form holes, surfaces, shapes, etc. in that material. More recently, additive manufacturing approaches have begun to emerge as suitable alternatives or replacements for the traditional subtractive approaches. Additive manufacturing (AM) includes adding individual layers of a material over one another to form a desired component shape, and can include techniques such as selective laser melting (SLM), also known as direct metal laser melting (DMLM) or direct metal laser sintering (DMLS), or selective electron beam melting (SEBM). Powder-based AM utilizes a heat source (e.g., a melting beam such as a laser beam or electron beam) to melt layers of a base material (e.g., a powdered metal) to form a desired shape, layer-by-layer. The melting beam forms a melt pool in the base material, which subsequently solidifies. Next, another layer of base material is placed (e.g., spread) over the underlying layer and melted to that layer to build up the part. This process is repeated for a number of layers until the component shape is formed. Often a hot isostatic pressing (HIP) process is used to remove cracks and defects (e.g., debonding, pores, etc.) which remain within the component after melting and solidification.

Conventional scanning strategies, e.g., as applied in SLM machines, use centro-symmetrical laser spot configurations providing uniform irradiation conditions in all scanning directions. Melting of powder material is realized by (often at least partially overlapping) parallel melting beam (e.g., laser) passes, also referred to as "tracks." The laser tracks can be visually represented by vectors (also referred to as scan vectors), which illustrate the direction of movement of the melting beam as it heats and melts the powder material. As noted herein, conventional scanning processes might leave cracks and defects in the component, which are often attempted to be healed by hot isostatic pressing (HIP). However, these conventional approaches, even when paired with HIP, can still fail to remove cracks and defects which are proximate the surface of the component, e.g., at its outer surface. Because these cracks and/or defects have openings at the component surface, HIP cannot effectively pressurize those cracks/defects and close them from the finished component. The remaining cracks and/or defects can structurally weaken the component, leading to undesirable performance in use.

BRIEF DESCRIPTION OF THE INVENTION

Various embodiments include approaches for controlling an additive manufacturing (AM) process. In some cases, an additive manufacturing (AM) system includes: a process chamber for additively manufacturing a component, the process chamber having: a build platform; a set of melting beam scanners configured to emit a melting beam for melting powder on the build platform; an applicator for applying layers of powder to the build platform; and a reservoir for storing powder; and a control system coupled with the set of melting beam scanners, the control system configured to: apply the melting beam to a layer of powder on the build platform along a primary melting path; and apply the melting beam to a solidified portion of the layer of powder on the build platform along a re-melting path after applying the melting beam along the primary melting path, the re-melting path overlapping a portion of the primary melting path and applied only in an area proximate a perimeter of the component.

A second aspect of the disclosure includes a computer program product having program code, which when executed by at least one computing device, causes the at least one computing device to control an additive manufacturing (AM) system having a process chamber for additively manufacturing a component, the process chamber at least partially housing: a build platform; a set of melting beam scanners over the build platform, each melting beam scanner configured to emit a melting beam for melting a powder on the build platform; an applicator for applying layers of the powder to the build platform; and a reservoir coupled with the applicator for storing the powder, by: analyzing data describing a shape of a component to be formed by the AM system to identify at least one re-melt region in the component; and in response to identifying at least one re-melt region in the component, instructing the set of melting beam scanners to: apply the melting beam to a layer of the powder on the build platform along a primary melting path; and apply the melting beam to a solidified portion of the layer of the powder on the build platform along a re-melting path after the applying of the melting beam along the primary melting path, wherein the re-melting path overlaps a portion of the primary melting path and is applied only in an area proximate a perimeter of the component.

A third aspect of the disclosure includes a computer-implemented method of controlling an additive manufacturing (AM) system having a process chamber for additively manufacturing a component, the process chamber at least partially housing: a build platform; a set of melting beam scanners over the build platform, each melting beam scanner configured to emit a melting beam for melting a powder on the build platform; an applicator for applying layers of the powder to the build platform; and a reservoir coupled with the applicator for storing the powder, the method including: analyzing data describing a shape of a component to be formed by the AM system to identify at least one re-melt region in the component; and in response to identifying at least one re-melt region in the component, instructing the set of melting beam scanners to: apply the melting beam to a layer of the powder on the build platform along a primary melting path; and apply the melting beam to a solidified portion of the layer of the powder on the build platform along a re-melting path after the applying of the melting beam along the primary melting path, wherein the re-melting path overlaps a portion of the primary melting path and is applied only in an area proximate a perimeter of the component.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
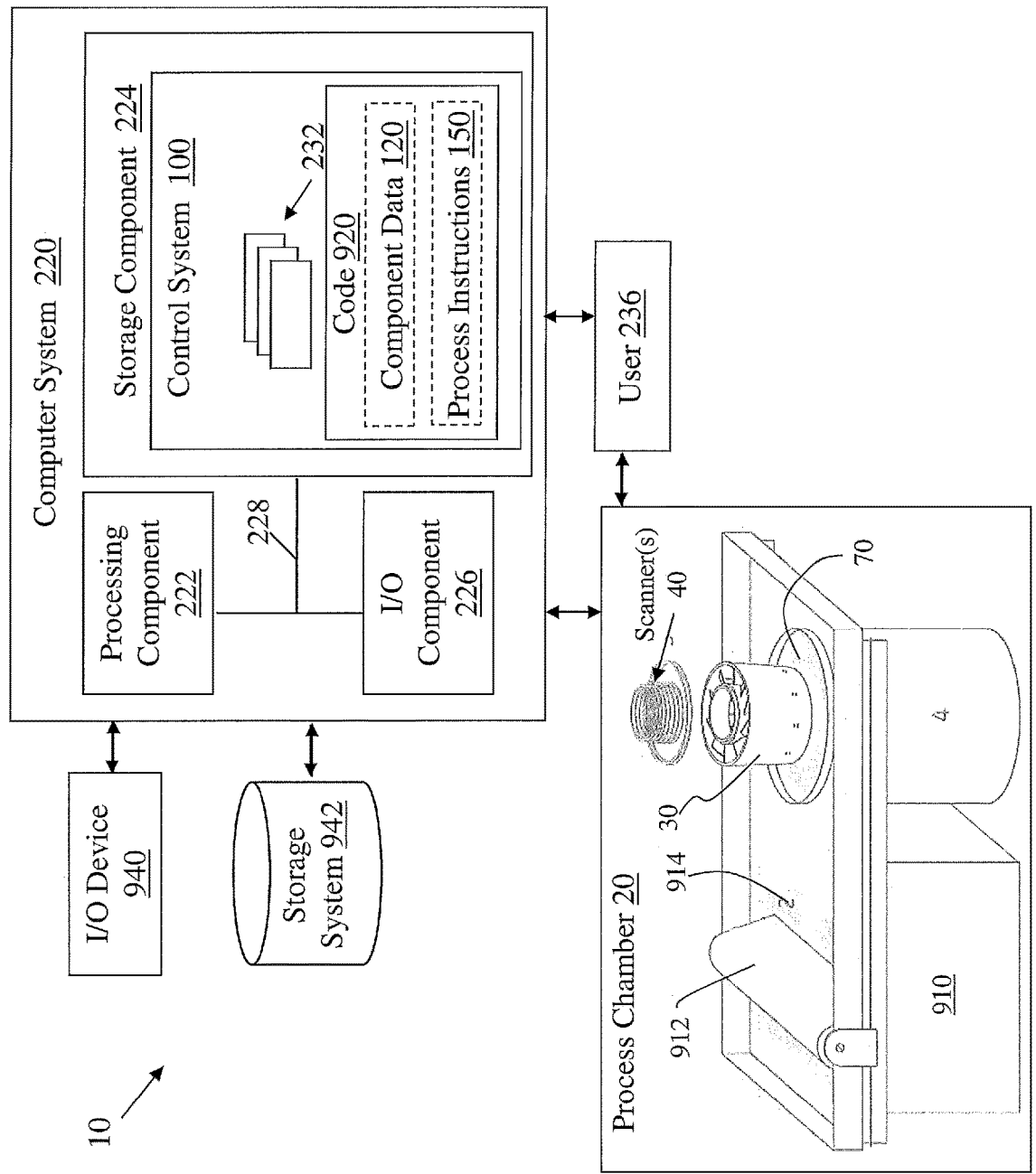
FIG. 1 shows a schematic depiction of an environment including a system according to various embodiments of the disclosure.

It is noted that the drawings of the various aspects of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated herein, the subject matter disclosed relates to manufacturing. More particularly, the subject matter disclosed herein relates to controlling manufacturing in melting beam additive manufacturing (AM) systems.

In contrast to conventional approaches, various aspects of the disclosure include approaches for controlling a position of one or more melting beams in an AM system to efficiently manufacture a component and diminish the incidence of surface defects and/or cracks. That is, in particular embodiments, approaches include systems, methods and computer program products for controlling a re-melting process proximate a surface of a component formed by melting beam AM. These approaches can include selectively re-melting the surface region of the component prior to forming the overlying layer, to enhance the structural integrity of the component after hot isostatic pressing (HIP). Various approaches for selective re-melting are disclosed herein, including applying a melting beam to a layer of base powder along a primary melting path length (and in some cases, direction), and subsequently applying the melting beam to the layer of base powder proximate a perimeter of the component formed by AM. In some cases, the re-melting process is performed proximate a perimeter of the component and/or proximate a perimeter of at least one (internal) aperture in the component. In some particular embodiments, the re-melting process is performed only in an area proximate the periphery of the component to be built by AM and/or proximate a periphery of the aperture(s). When a subsequent HIP process is performed on the component, including that layer (along with other layers), the selective re-melting process can help to mitigate residual surface defects and/or cracks in the component.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Figure 2:
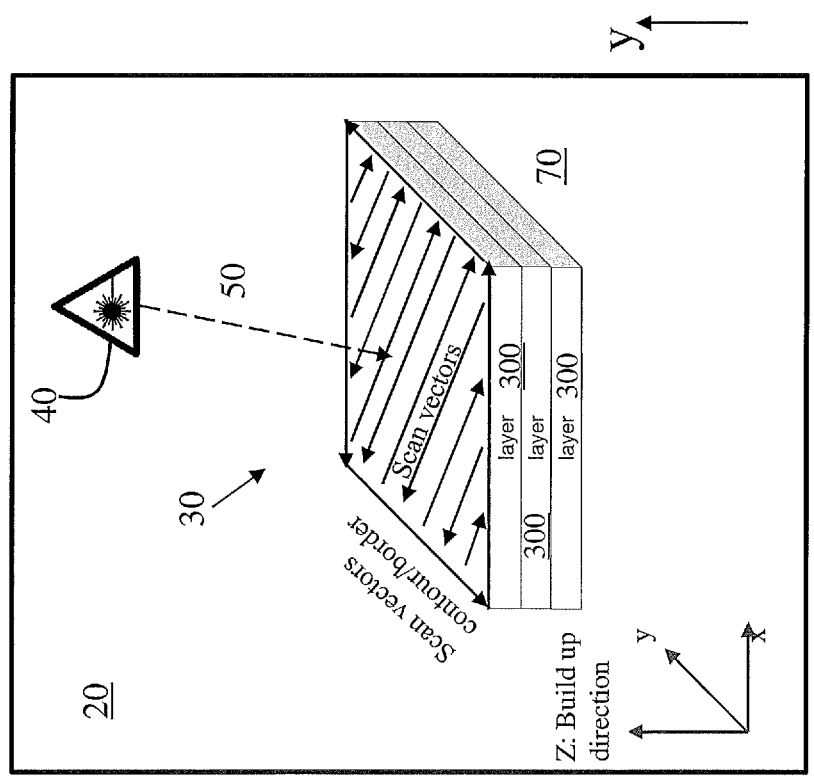
FIG. 2 shows a schematic depiction of a process chamber according to various embodiments of the disclosure.

FIG. 1 shows a schematic depiction of an additive manufacturing (AM) system 10 according to various embodiments of the disclosure. As shown, AM system 10 can include a process chamber 20 for additively manufacturing a component 30. Process chamber 20 can at least partially house a set (one or more) of melting beam scanners 40 (shown as a set in FIG. 1), each configured to emit a melting beam 50 (FIG. 2), such as a laser beam or an electron beam. FIG. 2 shows a schematic depiction of a portion of the interior of process chamber 20, and is referred to concurrently with FIG. 1. In some cases, component 30 can include a machine component, or any other component capable of being formed by the additive manufacturing processes described herein. In some particular cases, component 30 can include a turbomachine component or a dynamoelectric machine component, including at least one of a stator component, rotor component, turbine blade, nozzle, bucket, shroud, flange, etc.

Figure 3:
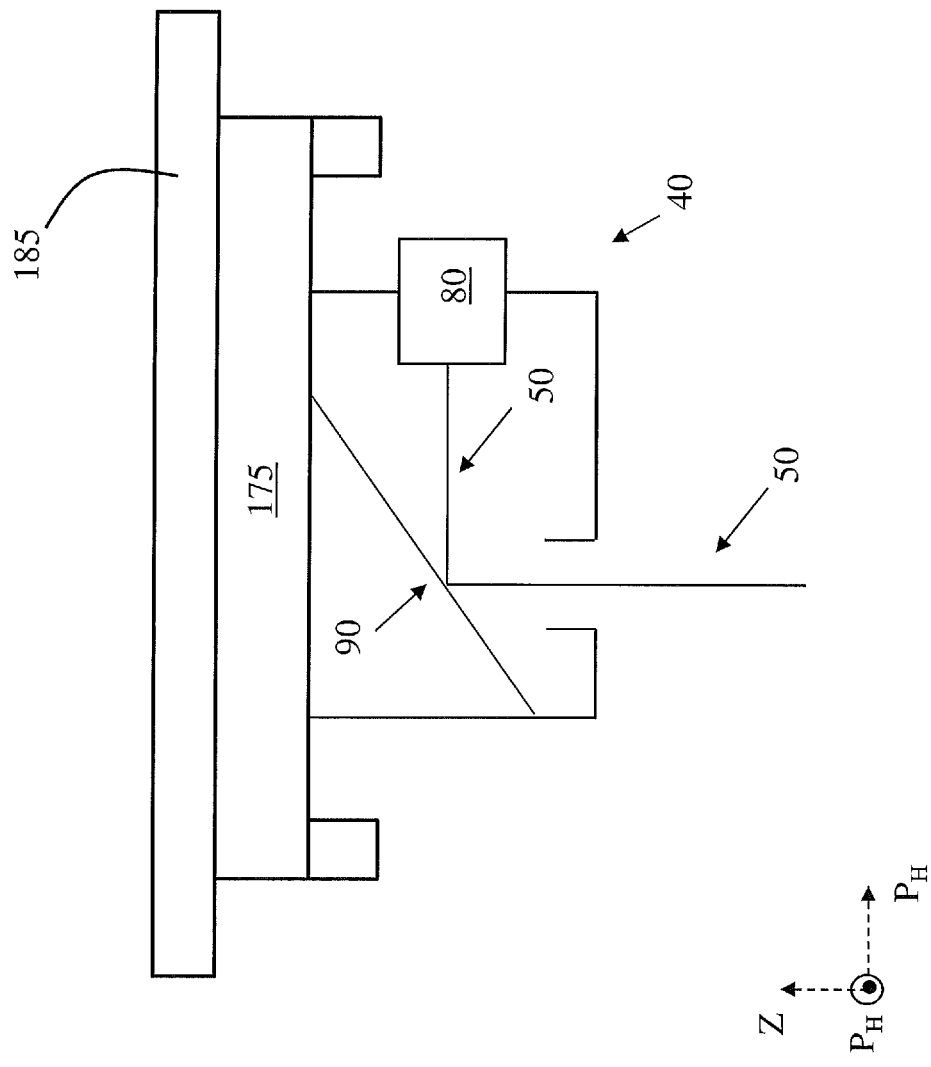
FIG. 3 shows a schematic depiction of a melting beam scanner according to various embodiments of the disclosure.

As noted herein, process chamber 20 can further include build platform 70, where melting beam scanners 40 are suspended over build platform 70. As is known in the art, and further illustrated in the schematic depiction of an example melting beam scanner 40 in FIG. 3, each melting beam scanner 40 can include a melting beam source (e.g., laser light source or electron beam source) 80 (FIG. 3) for providing melting beam 50 (FIG. 2). Melting beam scanner(s) 40 can further include a mirror 90 for deflecting melting beam 50 within process chamber 20. It is understood, however, that melting beam scanner(s) 40 may be any form of melting beam scanner, including, e.g., an electron beam melting scanner. The example depiction in FIG. 3 is intended only as one example of various melting beam scanners, which can be utilized according to various embodiments of the disclosure.

Returning to FIGS. 1 and 2, AM system 2 can further include a control system 100 coupled with melting beam scanners 40 (via process chamber 20 and computer system 220). Control system 100 can be physically coupled (e.g., via conventional mechanical couplings), communicatively coupled (e.g., via conventional wireless and/or hardwired means) and/or electrically coupled with melting beam scanners 40 in order to provide operating instructions and/or otherwise control operation of (and gather data from) melting beam scanners 40. Control system 100 is configured to control movement of melting beam scanner(s) 40 within one or more corresponding regions based upon a shape of component 30. That is, in particular embodiments, control system 100 is configured to initiate melting beam scanner(s) 40, e.g., to apply melting beam 50 to a base material to re-melt at least a portion (re-melt region) 110 of component 30 (FIGS. 4-8). As described herein, the portion (e.g., re-melt region) 110 of component 30 may include a portion of a layer of component 30.

With continuing reference to FIG. 1, in some cases, control system 100 is configured to analyze data (component data 120) describing the shape of component 30 in order to control the activity of melting beam scanner(s) 40. That is, in various embodiments, control system 100 is configured to analyze component data 120 to determine whether component 30 includes a re-melt region 110 (e.g., a perimeter region and/or a region proximate a designed aperture), and instruct scanner(s) 40 to apply melting beam 50 based upon a prescribed re-melt pattern.

In some cases, component 30 includes a multi-layer component, and control system 100 is configured to control operation of melting beam scanner(s) 40 for each layer of the component 30. That is, AM system 10 may include a direct metal laser melting (DMLM/SLM/DMLS) or a selective electron beam melting (SEBM) system or a direct metal laser deposition (DMLD) system, which includes depositing a material (e.g., a metal) as a powder, and instructing at least one of the melting beam scanners 40 to emit melting beam 50 to melt the powder. The melted powder is then solidified, a subsequent layer of powder is applied, and that subsequent layer is melted (via melting beam(s) 50) to bond with the underlying layer. This process is repeated for a plurality of layers to form a component, e.g., component 30. Control system 100 can analyze component data 120 to determine, on a level-by-level basis, whether one or more beams 50 should be applied within corresponding region(s) to aid in forming a portion (e.g., re-melt portion 110) of that layer of component 30.

In some cases, melting beam scanners 40 can have a substantially uniform power level, e.g., substantially equally powered melting beam light sources 80. However, in other embodiments, at least one melting beam scanner 40 has a different power level, or is operated at a different power level, relative to a remainder of scanner(s) 40. In some cases, to enhance the flexibility of AM system 10, control system 100 can be configured to modify the power level of scanner(s) 40 based upon a position of one or more scanner(s) 40 relative to component 30, as well as modifying the position of scanner(s) 40. As noted herein, control system 100 is configured to analyze component data 120 to identify whether component 30 includes a re-melt region 110 (e.g., a perimeter of component 30 and/or a region proximate an aperture within component 30), and in response to that identification, initiate the scanner(s) 40 to apply beam(s) 50 in order to re-melt region 110 and enhance the structural integrity of that region 110. Component data 120 may include information about the shape of component 30 (e.g., its size and coordinates), on an entire-component basis and/or a level-by-level basis. In various embodiments, component data 120 can include coordinate information about component 30 indicating that a portion of a given layer of component 30 includes a perimeter of the final component 30 (e.g., an outer surface or an area proximate the outer surface) or an area proximate a designed aperture in the final component 30 (e.g., an area surrounding or bordering an aperture). As used herein, the term "proximate" can refer to areas contacting or nearly contacting (e.g., within 0-3 millimeters) the feature. As described herein, control system 100 is configured to identify that a given layer of component 30 includes an area proximate the perimeter of component 30 and/or proximate an aperture in component 30, and initiate a re-melting process according to one or more protocols disclosed.

With continuing reference to FIG. 1, control system 100 can include any conventional electrical and/or mechanical control systems, and in various embodiments, may include logic configured to provide instructions to process chamber 20 according to particular inputs, as described herein. As shown, control system 100 can reside within a computer system 220, which is coupled with process chamber 20. In various embodiments, process chamber 20 and computer system 220 are contained within the same physical structure, but in other cases, these components can be physically separated but communicatively connected by any conventional means. Computer system 220 is shown including a processing component 222 (e.g., one or more processors), a storage component 224 (e.g., a storage hierarchy), an input/output (I/O) component 226 (e.g., one or more I/O interfaces and/or devices), and a communications pathway 228. In one embodiment, processing component 222 executes program code, such as control system 100, which is at least partially embodied in storage component 224. While executing program code, processing component 222 can process data, which can result in reading and/or writing the data to/from storage component 224 and/or I/O component 226 for further processing. Pathway 228 provides a communications link between each of the components in computer system 220. I/O component 226 can comprise one or more human I/O devices or storage devices, which enable a user 236 (e.g., human or machine user) to interact with computer system 220 and/or one or more communications devices to enable user 236 (e.g., human or machine user) to communicate with computer system 220 using any type of communications link. To this extent, control system 100 can manage a set of interfaces (e.g., graphical user interface(s), application program interface, and/or the like) that enable human and/or system interaction with control system 100.

In any event, computer system 220 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, control system 100 can be embodied as any combination of system software and/or application software. In any event, the technical effect of computer system 220 is to control additive manufacturing of component 30, as described herein.

Further, control system 100 can be implemented using a set of modules 232. In this case, a module 232 can enable computer system 220 to perform a set of tasks used by control system 100, and can be separately developed and/or implemented apart from other portions of control system 100. Control system 100 may include modules 232 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computer system 220.

When computer system 220 comprises multiple computing devices, each computing device may have only a portion of control system 100 embodied thereon (e.g., one or more modules 232). However, it is understood that computer system 220 and control system 100 are only representative of various possible equivalent computer systems that may perform a process described herein. To this extent, in other embodiments, the functionality provided by computer system 220 and control system 100 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 220 includes multiple computing devices, the computing devices can communicate over any type of communications link. Further, while performing a process described herein, computer system 220 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, control system 100 enables computer system 220 to control the additive manufacture of a component 30 within process chamber 20. Control system 100 may include logic for performing one or more actions described herein. In one embodiment, control system 100 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, control system 100 and logic included therein will be described herein as a specific use machine. As will be understood from the description, while logic is illustrated as including each of the above-stated functions, not all of the functions are necessary according to the teachings of the embodiments of the invention as recited in the appended claims.

In various embodiments, processes described herein can be iterated (repeated) periodically (e.g., according to schedule of x times per y period, and/or continuously) in order to aid in additive manufacture of one or more component(s) 30. In some cases, one or more of the processed described herein can be repeated, for example, for a set of components 30 (e.g., turbomachine components such as a set of steam turbine blades).

It is understood that component 30 (FIGS. 1-2) may be formed using an additive manufacturing (AM) process, including any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal or plastic, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM, DMLM, or DMLS), selective electron beam melting (SEBM) and/or direct metal laser deposition (DMLD). As described herein, in the current setting, melting beam-based approaches such as SLM, DMLM, DMLS, SEBM and DMLD have been found advantageous.

With continuing reference to FIG. 1, additional details of components within process chamber 20 are shown according to various embodiments. As noted herein, in some cases, AM system 10 is arranged for SLM/DMLM/DMLS/SEBM/DMLD. It is understood that the general teachings of the disclosure are equally applicable to other forms of additive manufacturing using melting beam scanners 40. AM system 10, as will be described, executes code 920 that includes a set of computer-executable instructions defining component 30 (component data 120), as well as process instructions 150 for performing an AM process to form component 30, as described herein. Each AM process may use different raw materials in the form of, for example, fine-grain powder, wire, a stock of which may be held in a chamber 910 of process chamber (e.g., AM printer). In the instant case, component 30 may be made of metallic materials, however in other cases, component may be formed at least partially of ceramics and/or metal-ceramic composites. As illustrated, within process chamber 20, an applicator 912 may create a thin layer of raw material 914 spread out as the blank canvas from which each successive slice of the final object will be created. In other cases, applicator 912 may directly apply or print the next layer onto a previous layer as defined by code 920 (including, e.g., component data 120), e.g., where the material is a metal and may include at least some ceramic or metal-ceramic composite material. In the example shown, at least one melting beam scanner 40 (e.g., one or more scanner 40) fuses particles for each slice, as defined by code 920. Various parts of process chamber 20 may move to accommodate the addition of each new layer, e.g., build platform 70 may lower and/or chamber 910 and/or applicator 912 may rise after each layer.

AM control system 100 is shown implemented on computer system 220 as computer program code. In some cases, computer system 220 is shown in communication with an external I/O device/resource 940 and a storage system 942. In general, processing component 222 executes computer program code, such as AM control system 100, that is stored in storage component 224 and/or storage system 942 under instructions from code 920 representative of component 30 (FIGS. 1-2), described herein. While executing computer program code, processing component 222 can read and/or write data to/from storage component 224, storage system 942, I/O device 940 and/or process chamber 20.

Additive manufacturing processes begin with a non-transitory computer readable storage medium (e.g., storage component 224, storage system 942, etc.) storing code 920 (e.g., including component data 120 and/or process instructions 150) representative of component 30. As noted, code 920 includes a set of computer-executable instructions defining component 30 and positioning of one or more melting beam scanners 40, upon execution of the code by system 10. For example, code 920 may include a precisely defined 3D model of outer electrode and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markuplanguage (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 10 and may come from a part designer, an intellectual property (IP) provider, a design company, the operator or owner of system 10, or from other sources. In any event, AM control system 100 executes code 920, dividing fill material for component 30 (FIGS. 1-2) into a series of thin slices that it assembles using process chamber 20 in successive layers of liquid, powder, sheet or other material. In the SLM/DMLM/DMLS/SEBM/DMLD example, each layer is melted to the exact geometry defined by code 920 and fused to the preceding layer. Subsequently, the component 30 may be exposed to any variety of finishing processes, e.g., minor machining, sealing, polishing, assembly to other parts, e.g. an igniter tip, etc. In various embodiments, after component 30 is formed by AM processing, it is exposed to a hot isostatic pressurizing (HIP) process. As described herein, according to various embodiments, system 10 is configured to minimize cracks and/or defects in component 30 after HIP is performed.

According to various embodiments, control system 100 is configured to control operation of melting beam scanners 40 to form component 30, e.g., to mitigate cracks and/or defects in component 30. With reference to FIGS. 2-9, in some cases, control system 100 is configured (e.g., programmed) to:

A) apply melting beam 50 (via laser scanner 40) to a layer 300 of powder (raw material) 914 on build platform 70 along a primary melting path 310 (FIGS. 4-7); and B) apply the melting beam 50 (e.g., via same laser scanner 40 or distinct laser scanner) to the same layer 300 of the powder 914 on build platform 70 along a re-melting path 320 after applying melting beam 50 along primary melting path 310. This process of applying melting beam 50 is performed prior to applying an additional layer 300 of powder 914 over current layer 300, such that the powder 914 is re-melted within that same layer 300. In various embodiments, the process of applying melting beam 50 along re-melting path 320 is performed in response to detecting at least one re-melt region 110 in the layer 300 of component 30. As noted herein, the re-melt region 110 can include a region that is proximate a perimeter (outer surface) of component 30 when finished, or a region proximate a designed aperture within component 30 when finished. In various embodiments, applying melting beam 50 along re-melting path 320 can remove at least one of a crack or other metallurgic defect (gas pore, void, non-molten powder, etc.) in the layer 300 of the powder 914.

In various embodiments, after applying melting beam 50 along re-melting path 320, one or more additional layers 300 of powder 914 is formed over the layer 300 subject to re-melt, and the AM process is completed. Further, after the final layer(s) 300 of powder are formed, component 30 may be subjected to a HIP process to remove residual cracks and/or defects in layer(s) 300 of powder. As discussed herein, system 10 is configured to aid in forming component 30 in such a manner that residual cracks and/or defects proximate the perimeter and/or a designed aperture of component 30 are minimized or substantially removed, leaving at most only cracks or defects in inner regions, which can be healed by a subsequent HIP operation.

Figure 4:
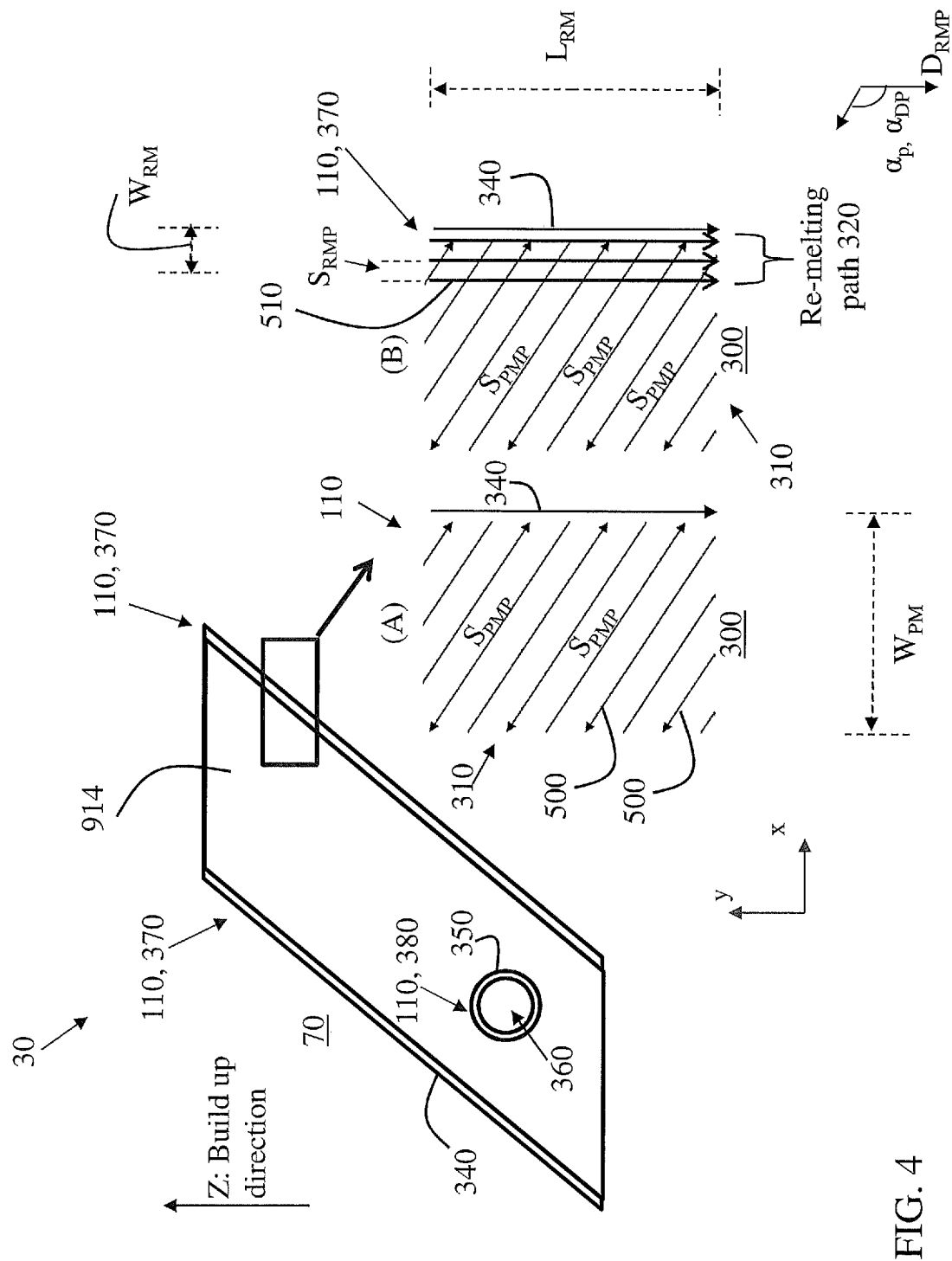
FIG. 4 shows a schematic depiction of an example component formed by melting and re-melting processes, including a close-up depiction of the melting and re-melting processes, according to various particular embodiments of the disclosure.

FIGS. 4-9 illustrate example approaches for forming components 30, including melting layers 300 of powder and re-melting selected portions of layer(s) 300 prior to forming an overlying layer 300. FIG. 4 illustrates a cross-sectional view of a layer 300 of a component 30, and close-up views of processes (A) and (B) in melting and re-melting powder 914 according to various embodiments. In one embodiment, shown in FIG. 4, re-melting path 320 is applied in a direction substantially parallel with a perimeter 340 of component 30 to be built by AM (in layer 300), and substantially parallel with a border 350 of a designed aperture (e.g., cooling channel) 360 in layer 300 of component 30. In some particular embodiments, e.g., as shown in FIG. 4, re-melting path 320 can include at least three (3) re-melting tracks or vectors. In various embodiments, perimeter 340 is defined by a contour melting path (indicated by arrow) which runs along the perimeter 340 of component 30 or along border 350 of a designed aperture 360. In various embodiments, this re-melting path 320 is applied only in (re-melt) area 370 proximate perimeter 340 and/or an (re-melt) area 380 proximate border 350 of aperture 360 within layer 300. It is understood that re-melting path 320 may also be applied only to selected layers 300 of powder, after it has been melted and solidified, such that one or more layers 300 of solidified powder are not subject to re-melting path 320. In other cases, every $n^{th}$ layer (where n is not equal to 1) of powder is subject to re-melting path 320.

Figure 5:
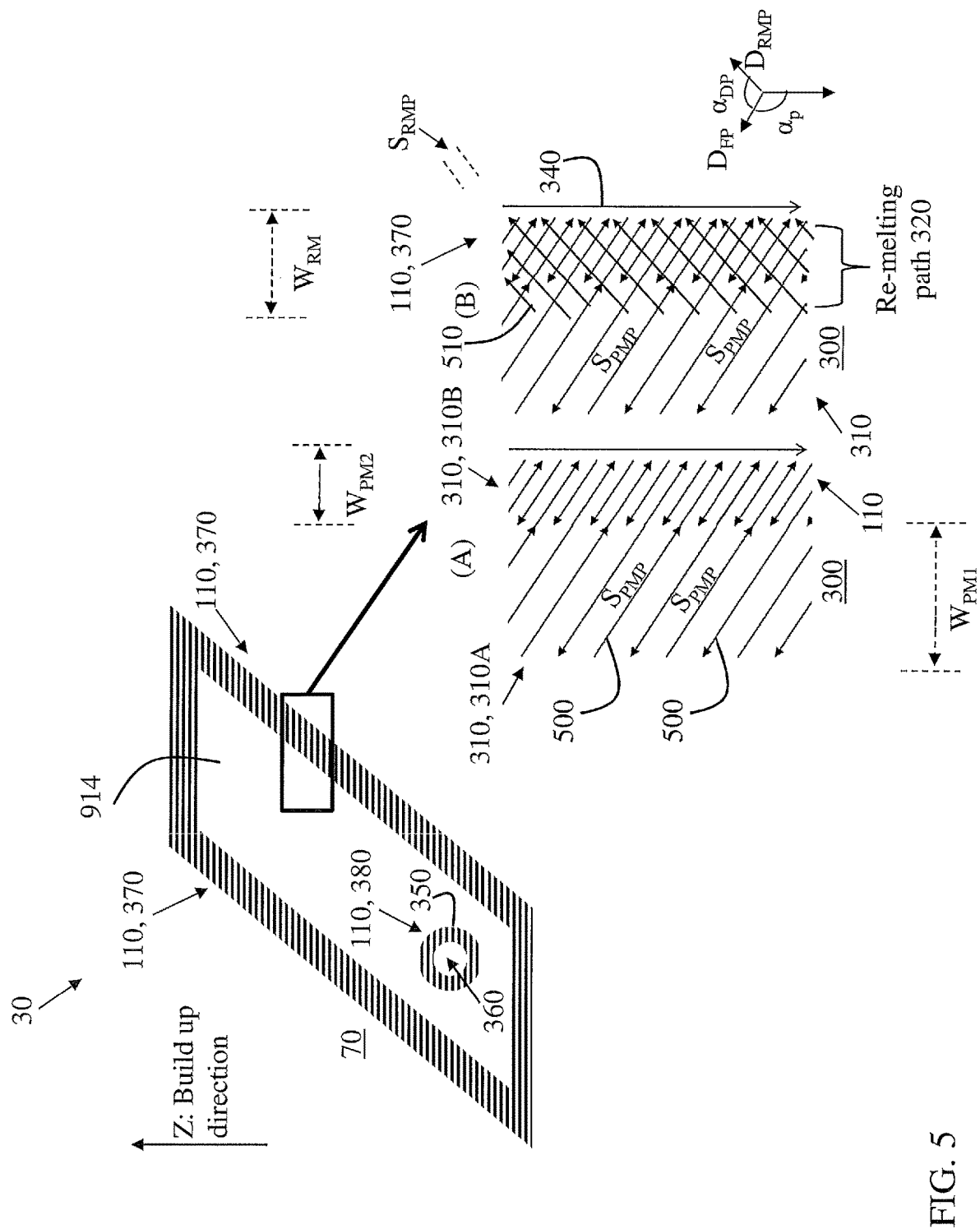
FIG. 5 shows a schematic depiction of an example component formed by melting and re-melting processes, including a close-up depiction of the melting and re-melting processes, according to various particular embodiments of the disclosure.

FIG. 5 shows another variation of component 30, along with close-up views of processes (A) and (B), whereby the primary melting path 310 includes two distinct melting paths 310A, 310B, which may have the same path angle ($\alpha_p$) measured with respect to perimeter 340 and border 350 of aperture 360, or in other embodiments, may have distinct path angles ($\alpha_p$). In this case, process (A), includes applying melting beam 50 (via laser scanner 40) to layer 300 of powder (raw material) 914 along primary melting path 310, which can include applying melting beam 50 to layer 300 of powder 914 along a first primary melting path 310A and subsequently applying melting beam 50 to that layer 300 of powder 914 along a second primary melting path 310B. In some cases, applying melting beam 50 along second primary melting path 310B melts a distinct area from first primary melting path 310, such as area 370 proximate perimeter 340 and/or area 380 proximate border 350 of aperture 360), however, there may be partial overlap between the areas melted by first primary melting path 310A and second primary melting path 310B. In some cases, the distance between adjacent beam paths in first primary melting path 310A is distinct from a distance between adjacent beam paths in second primary melting path 310B, e.g., second primary melting path 310B could have a shorter distance between adjacent beam paths. In other embodiments of the invention, the area along the second primary melting path 310B can be molten with a different set of process parameters (combinations of scanning speed, laser spot size, laser power and laser focus position, vector spacing, etc.) than used for the area along the first primary melting path 310A. In this example configuration in FIG. 5, re-melting path 320 can re-melt powder 914 in area 370 proximate perimeter 340 and/or area 380 proximate border 350 of aperture 360, and can overlap with second primary melting path 310B as well as a portion of first primary melting path 310A. In particular cases, as described herein, re-melting path 320 can re-melt (solidified) powder 914 only in area 370 (as viewed in cross-section of layer) proximate perimeter 340 and/or in area 380 (as viewed in cross-section) proximate border 350 of aperture 360.

Figure 6:
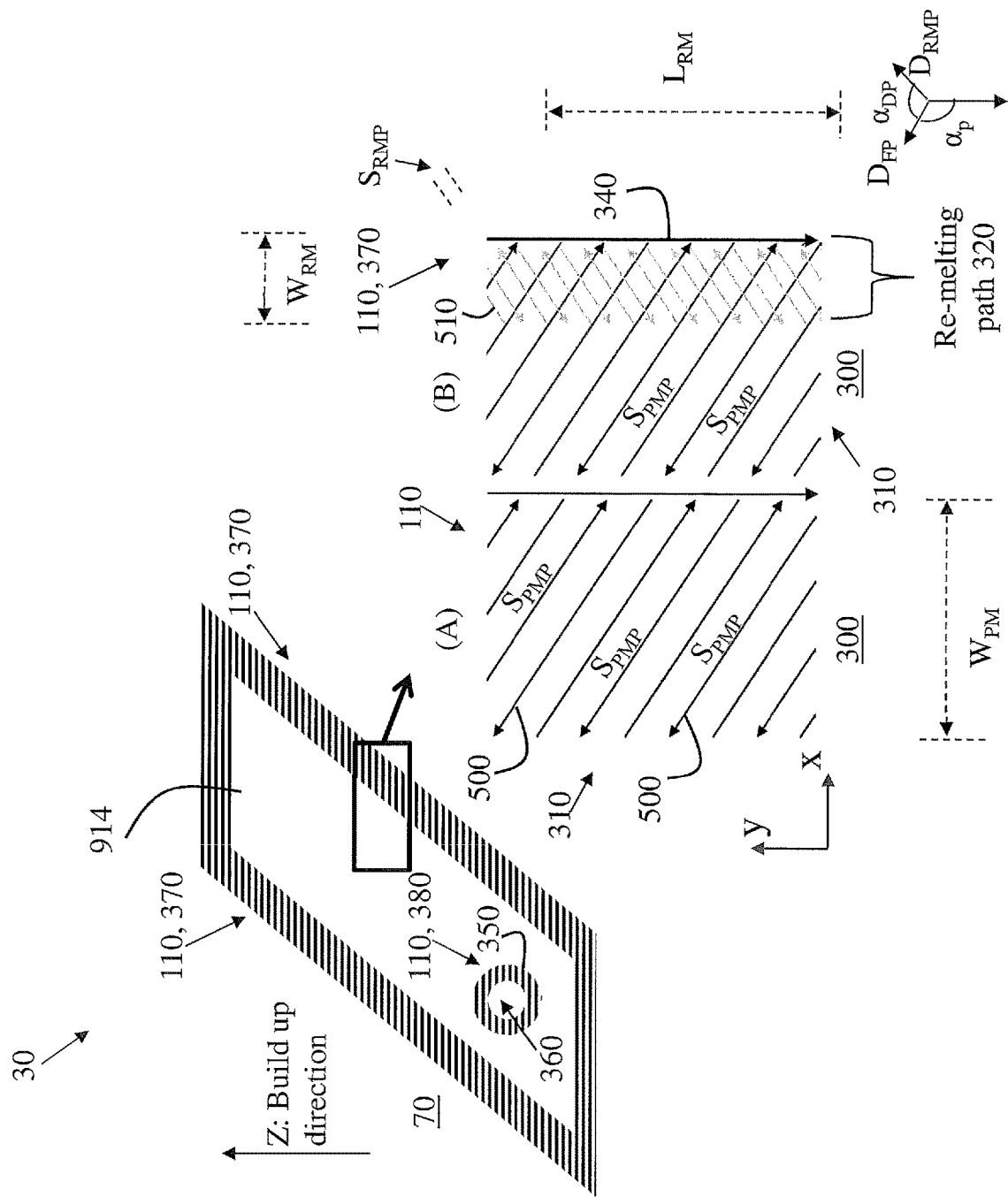
FIG. 6 shows a schematic depiction of an example component formed by melting and re-melting processes, including a close-up depiction of the melting and re-melting processes, according to various particular embodiments of the disclosure.

FIG. 6 shows another variation of component 30, along with close-up views of processes (A) and (B), whereby the primary melting path 310 extends to perimeter 340 of component 30 (within layer 300) and/or border 350 of aperture 360, and re-melting path 320 overlaps primary melting path 310 in area 370 proximate perimeter 340 and/or area 380 proximate border 350 of aperture 360.

Figure 7:
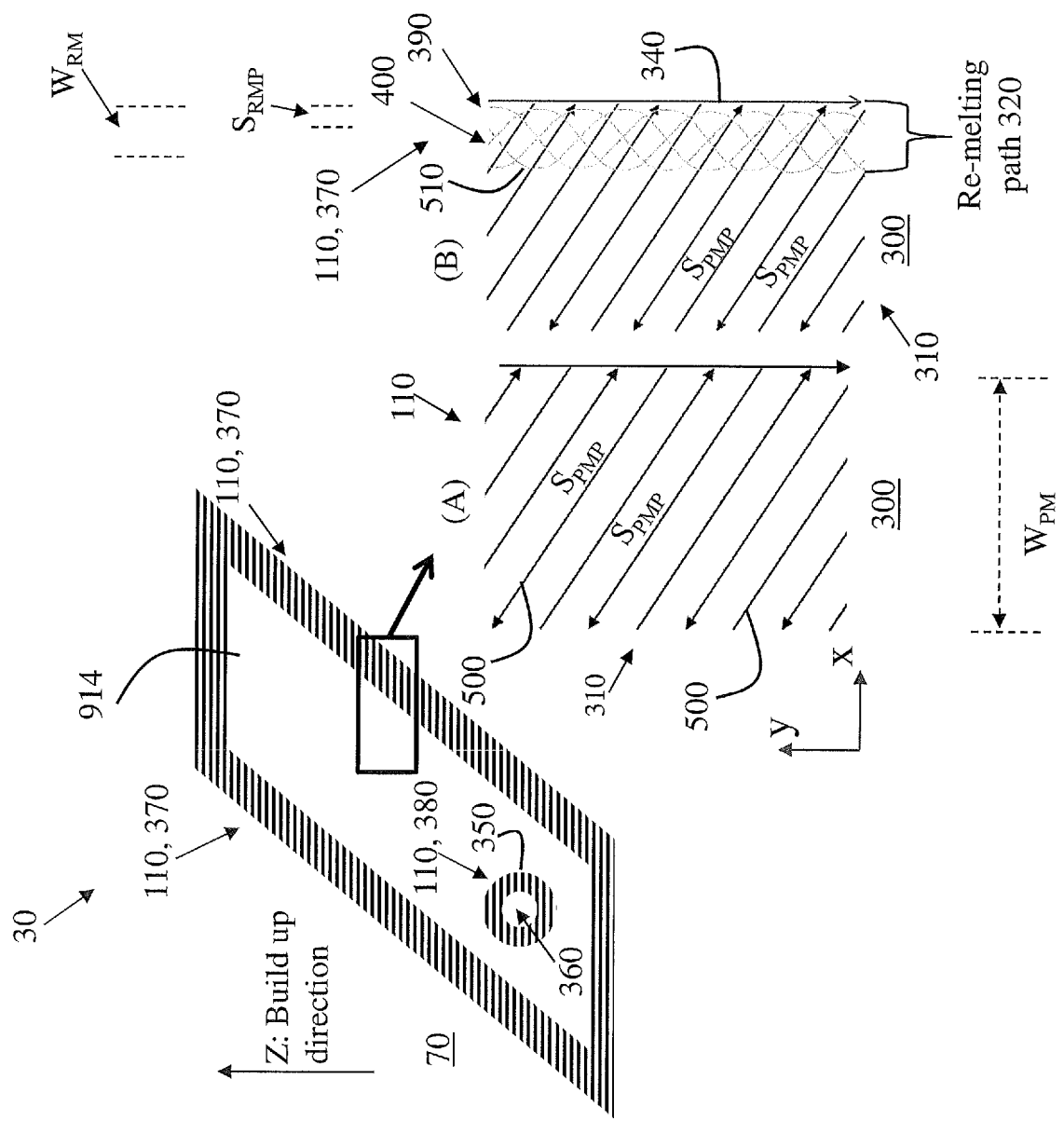
FIG. 7 shows a schematic depiction of an example component formed by melting and re-melting processes, including a close-up depiction of the melting and re-melting processes, according to various particular embodiments of the disclosure.

FIG. 7 shows another variation of component 30, along with close-up views of processes (A) and (B), whereby the primary melting path 310 extends to perimeter 340 of component 30 (within layer 300) and/or border 350 of aperture 360, and re-melting path 320 overlaps primary melting path 310 in area 370 proximate perimeter 340 and/or area 380 proximate border 350 of aperture 360. In the example configuration in FIG. 7, the re-melting path 310 is a continuous sinusoidal or spiraling (wobble) path 390, where the movement of the re-melting beam is the consequence of a superposition of a linear velocity component of the re-melting beam and at least one additional oscillating velocity component of the re-melting beam, resulting in continuous segments 400 each overlapping a plurality of primary melting paths 310.

Figure 8:
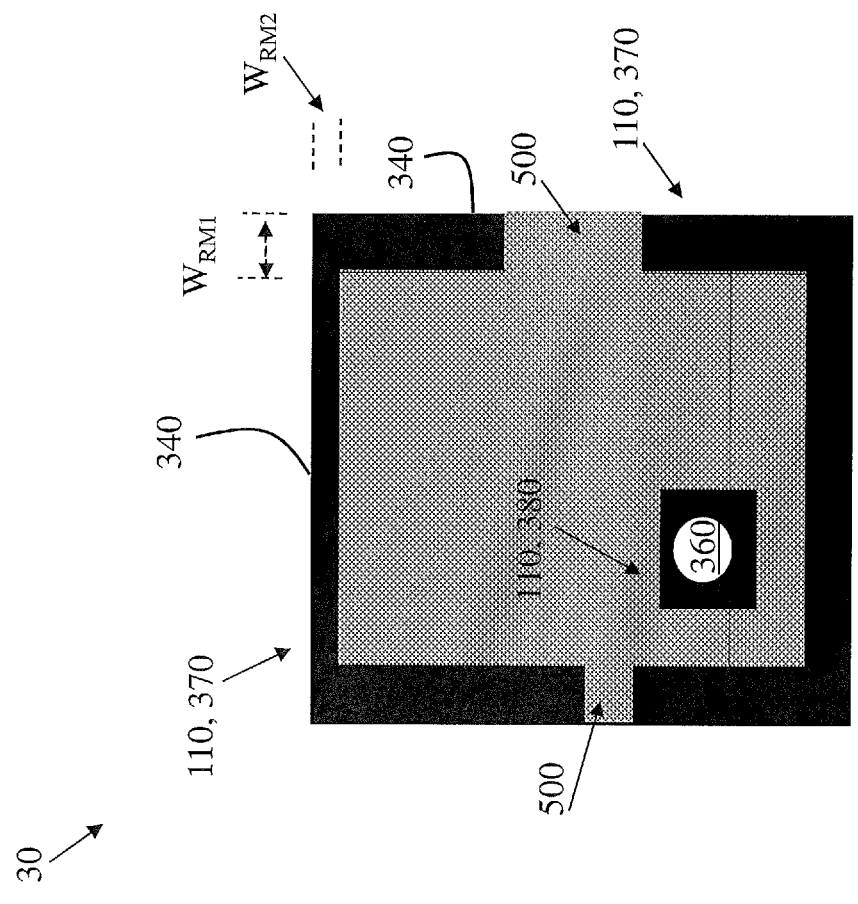
FIG. 8 shows a schematic depiction of an additional component formed by melting and re-melting processes according to various other embodiments of the disclosure.
Figure 9:
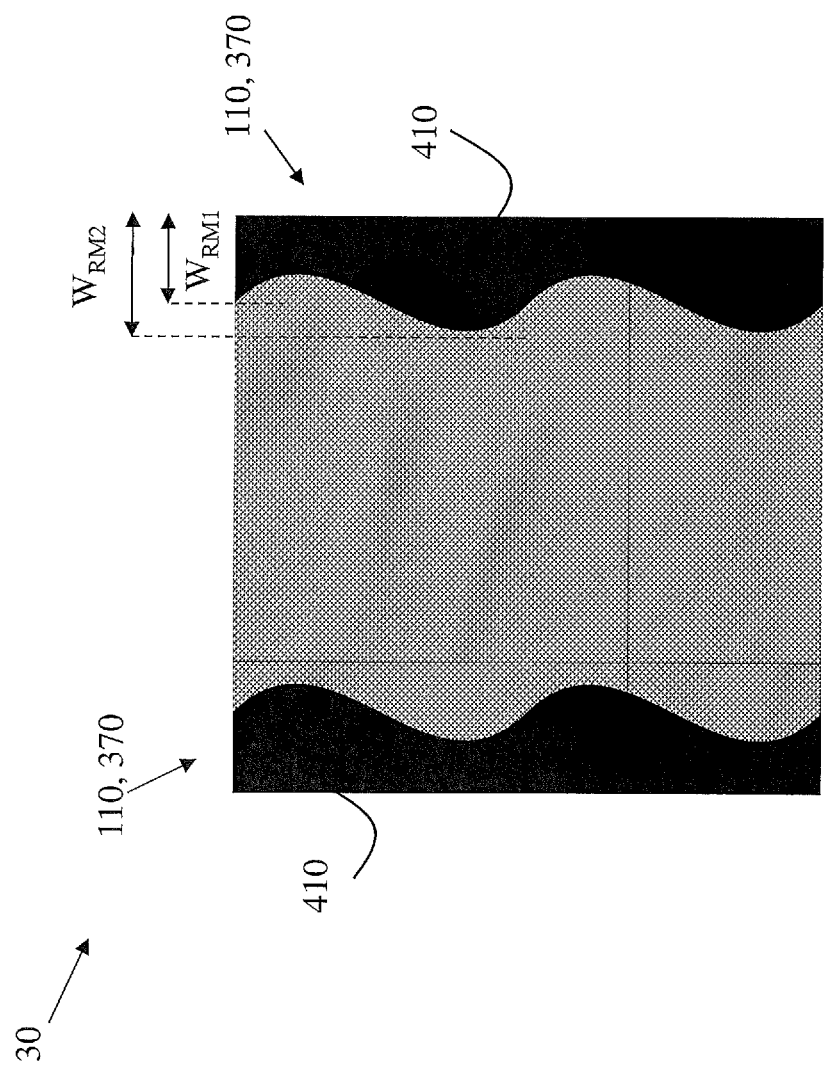
FIG. 9 shows a schematic depiction of an additional component formed by melting and re-melting processes according to various other embodiments of the disclosure.

FIG. 8 illustrates an additional embodiment of a component 30, whereby only a portion of an area 370 proximate the perimeter 340 of component 30 is re-melted using one or more re-melting processes described herein. In this case, re-melting may be substantially non-uniform across area 370 proximate perimeter of component 30, e.g., such that the width ($W_{RM}$) of the re-melting area 370 as measured from perimeter 340 varies around component 30, e.g., such that re-melting area 370 may have a first width ($W_{RM1}$) along a first portion of component 30 and a second width ($W_{RM2}$) along a second portion of component 30. FIG. 8 also illustrates that in some embodiments, one or more gaps 500 separate re-melt areas 370 along perimeter 340, such that only a primary melting process is performed proximate the perimeter 340 in these gaps 500. FIG. 9 illustrates yet another embodiment of component 30, whereby area 370 proximate perimeter 340 of component 30 is re-melted in a non-uniform pattern 410. This non-uniform pattern 410 can have distinct re-melt area 370 widths ($W_{RM1}$, $W_{RM2}$) at distinct locations along a perimeter 340 of component 30.

With continuing reference to FIGS. 4-8, in various embodiments, re-melting area 370 has a distinct width ($W_{RM}$) than a width ($W_{PM}$) of the area melted by primary melting path 310, and overlaps a portion of primary melting path 310, e.g., as measured in a direction perpendicular to perimeter 340. For example, in the configuration shown in FIGS. 4 and 7, width ($W_{RM}$) of re-melting path 320 area 370 is less than width ($W_{PM}$) of primary melting path. In the example configuration of FIG. 4, re-melting path 320 can extend along area 370 proximate perimeter 340 of component in a direction substantially parallel with perimeter 340. In some cases, for example, as shown in FIG. 4, re-melting path 320 can include a plurality of beam paths with a common direction (e.g., all traversing the same direction).

In some other cases, as shown in the example configuration of FIGS. 5 and 6, the width ($W_{RM}$) of re-melting path 320 area 370 is less than the width ($W_{PM}$) of the area of primary melting path 310. In FIG. 5, re-melting path 320 is shown as having a smaller width ($W_{RM}$) than the width ($W_{RM1}$) of first primary melting path 310A. In these cases, re-melting path 320 can have an approximately equal or substantially (e.g., at least +1 percent) greater width ($W_{RM}$) than the width ($W_{RM2}$) of second primary melting path 310B. In the configuration of FIG. 6, re-melting path 320 area 370 (in cross-section) has a smaller width ($W_{RM}$) than width ($W_{PM}$) of primary melting path 320, as measured in the x direction (e.g., perpendicular with perimeter 340).

In various embodiments, for example, as shown in FIGS. 4-7, primary melting path 310 can have a first path direction ($D_{FP}$), and re-melting path 320 can have a second path direction ($D_{RMP}$) distinct from first path direction ($D_{FP}$). For example, in some cases, second path direction ($D_{RMP}$) forms an angle ($\alpha_{DP}$) with first path direction ($D_{FP}$) of approximately 0 degrees to approximately 180 degrees, and in particular cases, the angle ($\alpha_{DP}$) may be between 45 degrees to approximately 135 degrees. Additionally, as illustrated in FIGS. 4-7, primary melting path 310 can have a set of parallel path vectors 500 separated by a first spacing ($S_{PMP}$), and re-melting path 320 can have a set of parallel path vectors 510 separated by a second, distinct spacing ($S_{RMP}$). It is understood that the second spacing ($S_{RMP}$) between path vectors 510 may differ depending upon the direction of re-melting path 320 (e.g., in FIG. 4 versus FIG. 5, FIG. 6 or FIG. 7), or the nature of the path vectors 510 (e.g., sinusoidal paths 390 in FIG. 7). However, in most all embodiments, second spacing ($S_{RMP}$) of vectors 510 in re-melting path 320 is distinct from first spacing ($S_{PMP}$) of vectors 500 primary melting path 310.

It is also understood, that in the embodiments shown and described with reference to FIGS. 4-9, the process parameters (e.g., scan speed, laser spot size, laser power, laser focus position, vector spacing) used for the secondary re-melting process may be different from those used for the primary melting process. Even if the secondary re-melting step is omitted as shown in process A) of FIG. 5, the process parameters used for the primary melting of the area 370, which is proximate to the perimeter 340 of component 30, can be different than those used for the inner area of component 30.

It is understood that the path vectors shown and described with reference to FIGS. 4-9 are merely for illustrative purposes. For example, path vectors 500 of primary melting path are shown as having a bound on particular edges (e.g., the left-hand side of (A) in FIGS. 4-7, however, these path vectors 500 may only illustrate a portion of the actual path vectors employed according to embodiments of the disclosure. That is, as is illustrated in the cross-sections of components 30 in FIGS. 4-7, views (A) and (B) show only portions of component 30's proximate perimeter 340. Further, it is understood that the geometry of component 30 may be such that it is beneficial to include gradients, transitions or other differences between the length, orientation or other process parameters of neighboring primary melting path vectors and/or re-melting path vectors.

As described herein, AM system 10 is configured to selectively apply re-melting approaches (e.g., including mixing of primary melting processes and re-melting processes with different parameters and/or strategies) to portions of a component 30 formed by additive manufacturing. Various configurations of selective primary melting, which can be combined with an additional re-melting can be utilized according to the disclosure in order to reduce the number of metallurgical defects and/or cracking in the finished component 30. In any case, AM system 10, which controls at least one melting beam scanner 40, has the technical effect of enhancing the process efficiency in additively manufactured components (e.g., component 30), improving the usable lifespan of such components 30, e.g., when compared with conventional systems and approaches.

It is understood that in the process embodiments described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An additive manufacturing (AM) system comprising:
   a process chamber for additively manufacturing a component, the process chamber at least partially housing:
      a build platform;
      at least one melting beam scanner over the build platform, each melting beam scanner configured to emit a melting beam for melting a powder on the build platform;
      an applicator for applying layers of the powder to the build platform; and
      a reservoir coupled with the applicator for storing the powder; and
   a computer system coupled with the at least one melting beam scanner, the computer system configured to:
      apply the melting beam to a layer of the powder on the build platform along a primary melting path; and
      apply the melting beam to a solidified portion of the layer of the powder on the build platform along a re-melting path after the applying of the melting beam along the primary melting path, wherein the re-melting path overlaps a portion of the primary melting path and is applied only in an area proximate a perimeter of the component.

2. The system of claim 1, wherein the re-melting path spans the area within the build platform proximate the perimeter, and wherein the area of the re-melting path has a distinct width than a width of an area of the primary melting path.

3. The system of claim 1, wherein the applying of the melting beam along the re-melting path is performed prior to applying an additional layer of the powder over the layer of the powder.

4. The system of claim 1, wherein the primary melting path has a first path direction, and the re-melting path has a second path direction, wherein the first path direction is distinct from the second path direction.

5. The system of claim 4, wherein the second path direction forms an angle with the first path direction of approximately 0 degrees to approximately 180 degrees.

6. The system of claim 1, wherein the re-melting path is applied to selected distinct solidified layers of the component.

7. The system of claim 1, wherein the area proximate the perimeter of the layer of the powder within the build platform extends approximately 0-3 millimeters from the perimeter.

8. The system of claim 1, wherein the melting beam further applies the re-melting path in an area proximate a designed aperture in the component, the designed aperture extending through the layer of the powder.

9. The system of claim 1, wherein the re-melting path has a distinct set of process parameters from the primary melting path, and wherein applying the melting beam along the re-melting path removes at least one of a crack or other metallurgical defect in the layer.

10. The system of claim 1, wherein the re-melting path includes a sinusoidal or spiraling path having continuous segments overlapping a plurality of primary melting paths.

11. The system of claim 1, wherein the component includes a multi-layer component, and wherein the computer system is configured to control the applying of the melting beam along the primary melting path and the re-melting path for a plurality of layers of the multi-layer component.

12. The system of claim 1, wherein the primary melting path includes a set of parallel path vectors separated by a first spacing, and wherein the re-melting path includes a set of parallel path vectors separated by a second spacing distinct from the first spacing.

13. The system of claim 1, wherein the re-melting path is applied in a non-uniform pattern along the area proximate the perimeter of the component.

14. A non-transitory computer readable storage medium storing a computer program product comprising program code, which when executed by at least one computing device, causes the at least one computing device to control an additive manufacturing (AM) system having a process chamber for additively manufacturing a component, the process chamber at least partially housing: a build platform; at least one melting beam scanner over the build platform, each melting beam scanner configured to emit a melting beam for melting a powder on the build platform; an applicator for applying layers of the powder to the build platform; and a reservoir coupled with the applicator for storing the powder, by:
   instructing the at least one melting beam scanner to:
      apply the melting beam to a layer of the powder on the build platform along a primary melting path; and
      apply the melting beam to a solidified portion of the layer of the powder on the build platform along a re-melting path after the applying of the melting beam along the primary melting path, wherein the re-melting path overlaps a portion of the primary melting path and is applied only in an area proximate a perimeter of the component.

15. The non-transitory computer readable storage medium storing a computer program product of claim 14, wherein the re-melting path spans the area within the build platform proximate the perimeter of the component, and wherein the area of the re-melting path has a distinct width than a width of an area of the primary melting path.

16. The non-transitory computer readable storage medium storing a computer program product of claim 14, wherein the applying of the melting beam along the re-melting path is performed prior to applying an additional layer of the powder over the layer of the powder.

17. The non-transitory computer readable storage medium storing a computer program product of claim 14, wherein the primary melting path has a first path direction, and the re-melting path has a second path direction, wherein the first path direction is distinct from the second path direction.

18. The non-transitory computer readable storage medium storing a computer program product of claim 14, wherein the re-melting path is applied to selected distinct layers of the powder in the component.

19. A computer-implemented method of controlling an additive manufacturing (AM) system having a process chamber for additively manufacturing a component, the process chamber at least partially housing: a build platform; at least one melting beam scanner over the build platform, each melting beam scanner configured to emit a melting beam for melting a powder on the build platform; an applicator for applying layers of the powder to the build platform; and a reservoir coupled with the applicator for storing the powder, the method comprising:

instructing the at least one melting beam scanner to:
apply the melting beam to a layer of the powder on the build platform along a primary melting path; and
apply the melting beam to a solidified portion of the layer of the powder on the build platform along a re-melting path after the applying of the melting beam along the primary melting path, wherein the re-melting path overlaps a portion of the primary melting path and is applied only in an area proximate a perimeter of the component.

20. The computer-implemented method of claim 19, wherein the applying of the melting beam along the re-melting path is performed prior to applying an additional layer of the powder over the layer of the powder.

\* \* \* \* \*